United States Patent [19]
Engelhardt

[11] 3,778,091
[45] Dec. 11, 1973

[54] FLOW METER HOUSING CONSTRUCTION

[75] Inventor: Helmut Engelhardt, Duisburg, Germany

[73] Assignee: Ludwig Krohne, Duisburg, Germany

[22] Filed: May 19, 1971

[21] Appl. No.: 144,862

[30] Foreign Application Priority Data
May 19, 1970 Germany.................. P 20 24 238.0
Oct. 23, 1970 Germany.................. P 20 52 030.3

[52] U.S. Cl................... 285/238, 285/348, 277/109
[51] Int. Cl.............................................. F16l 49/00
[58] Field of Search.................... 285/238, 348, 368, 285/415, 414, 412, 9 R; 277/102, 101, 108, 113, 107, 109, 59

[56] References Cited
UNITED STATES PATENTS
3,186,743  6/1965  Russell........................... 285/348 X
1,234,104  7/1917  Vissering....................... 285/420 X
673,714  5/1901  Karns.................................. 277/109

*Primary Examiner*—Jordan Franklin
*Assistant Examiner*—Wayne L. Shedd
*Attorney*—John J. McGlew et al.

[57] ABSTRACT

A fluid meter or gage which includes a central transparent portion through which the fluid is adapted to flow and which is usually made of a material such as glass so that a float indicator or similar phenomena therein is visible, also includes end fittings which are adapted to bear against respective ends of the central transparent member and be sealed therewith. The end fittings of the housing are interconnected by a yoke which includes a sleeve portion extending around each fitting and an interconnecting straight member extending between the sleeves. The packing elements surrounding the transparent portion is urged to bear in sealing engagement with the end fitting at each end thereof by lever means in the form of a U-shaped member having leg portions which are pivoted in selected recesses on the interconnecting straight member of the yoke and which has an intermediate bearing forming a fulcrum which presses against the packing to urge it into a sealing position around the associated end of the transparent intermediate member. Force is applied to the U-shaped lever by a threaded screw member which is engaged with the collar at each end.

7 Claims, 5 Drawing Figures

Inventor:
HELMUT ENGELHARDT

John J. McGlew
ATTORNEY

Inventor:
HELMUT ENGELHARDT

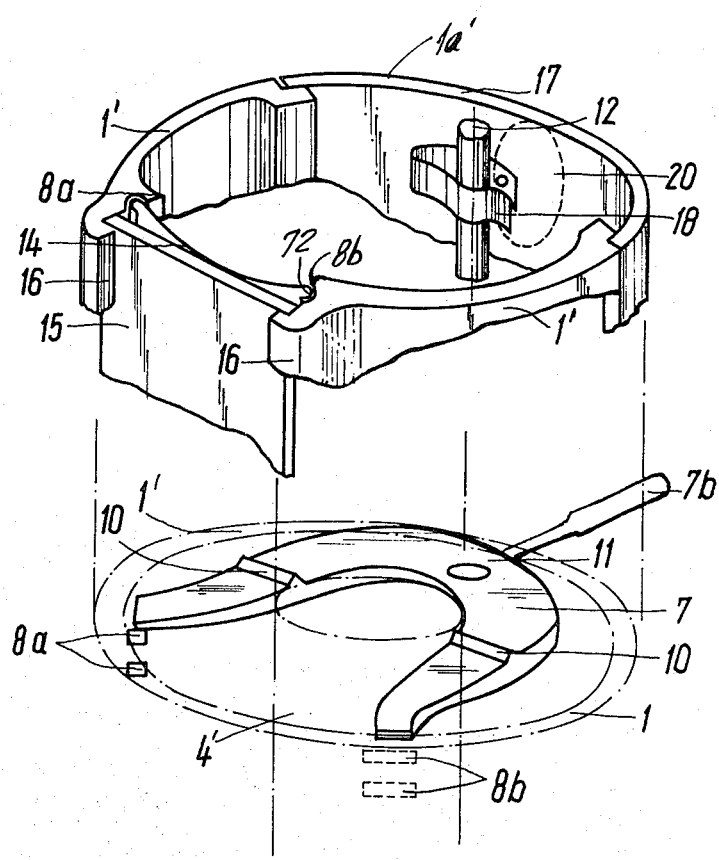

FLOW METER HOUSING CONSTRUCTION

SUMMARY OF THE INVENTION

This invention relates in general to stuffing box packings particularly for fluid meters and, in particular, to a new and useful stuffing box packing and fluid meter construction in which the packing is held in a sealing position by lever means which may be adjustably brought to bear against the packing.

Stuffing box packings are usually equipped with a gland or a screw joint with which the packing may be compressed. The present invention is particularly directed to a construction of a stuffing box which is adapted to be employed with an intermediate tube or measuring glass of a material such as a glass which joins with an end fitting made of a metal material. Such an arrangement is common, for example, in respect to flow meters and with devices of this nature, it is difficult to secure the packing between the two materials with the known packing equipment. When the known packing elements are employed which include threadable screw members for applying pressure on the gasket joint, there is a tendency for the clamping elements to cause cracks in the glass of the intermediate tube so that it breaks off. Even in those instances in which the tightening wrench or fastening element is pressed accidentally against the measuring glass when tightening or loosening the gland screws, the measuring glass can become defective and unusable.

With devices in the nature of a flow meter, it is usual to require regular exchange of the measuring glasses for various reasons, for example, in order to change the float, to insert measuring chambers for different measuring ranges and widths, and to clean the chambers or to replace defective glasses. With the known devices, this is very difficult in view of the limited space inside the housing of the measuring instrument.

The invention is an improvement over the prior art, particularly in respect to an arrangement for holding a packing assembly or packing element in a position in which it may be easily compressed around an intermediate glass part of a housing construction which includes a glass or other transparent material along with other material parts, such as a metal. The arrangement of the invention includes a housing portion or bracket providing a holding recess for receiving a pivotal lever member which includes a portion such as a projection defining a fulcrum which may be pressed against the packing and which also includes means for adjusting the outer end thereof so that the pressure force applied against the packing may be easily adjusted. The pressure lever advantageously is formed as a U-shaped member with leg portions which engage in associated recesses of a bracket member and the opposite end is connected to means such as a threadable adjusting screw which may be rotated in order to vary the pressure exerted on the lever and the fulcrum parts thereof which bear against the packing. The arrangement is such that the device may be easily tightened or loosened and even removed without any difficulty.

In the preferred embodiment, the lever member is forked and includes projections on each leg portion which are adapted to bear agaist the packing. The ends of the legs are adapted to be received in receiving grooves or holders on the housing. The arrangement is such that the lever force may be exerted on the packing evenly even though the gaskets or the individual packing elements may vary in thickness or even be uneven. In order to provide a central pressing on the gasket packing, the lever is provided with pressure cams or projections which act on a collar or cap enclosing the gasket. The projections can alternately be arranged on the collar itself rather than on the lever member.

The lever member is advantageously made of a fork-shape so that the leg portions surround the measuring chamber of transparent material and the projections which form fulcrums are arranged on each side of the chamber. The contact pressure is determined by selecting the position of the pivotal ends of the lever arms, for example, the spacing of the outer ends of these arms from the collar. It is also possible to increase the lever action by inserting an extension into the bore of the lever at its outer end. The lever can also be used for loosening the thrust collar containing the gasket or packing. A further use of the lever construction is the holding of an additional part of the measuring instruments, for example, a surrounding protective cover. For this purpose, the adjustment screw for shifting the lever so that it applies a force on the gasket may also be used for anchoring the front covering in position. This may be accomplished by engaging the front cover or a clamping element thereon with the securing screw. The clamping elements may be held in place by a knob portion which projects from the outer surface of the cover so that the cover can also be handled by this projection. The cover may be installed, for example, by pressing the spring clips against the thrust screw in order to secure the cover in position. The cover or lid may be used for aiding and permitting the escape of an overpressure in the housing and it will also protect a bystander against splinters or fluid medium in the event of a rupture of the measuring chamber material.

The invention advantagelusly includes a yoke housing with a collar at each end which engages around the metal fitting which is adapted to be pressed to each end of the cenral measuring glass through which the fluid is passed during measurement. The securing lever is advantageously oriented in a selected one of a plurality of recesses defined on the interior side of the yoke and it is pressed against the packing by a threaded screw member which freely passes through the collar of the yoke and which is threaded into the lever. The yoke cenral part may also provide a means for mounting any one of a number of elements, for example, a graduated scale, which may be oriented alongside the intermediate flow chamber made of glass material. The yoke includes a straight backwall which is held in grooves of a collar member at each end and which are biased into the position against the outer wall boudning the groove by a spring plate which may be easily inserted into the end of the collar.

Accordingly, it is an object of the invention to provide an improved apparatus for maintianing a packing seal.

A further object of the invention is to provide a packing seal construction which includes one or more gaskets adapted to be applied in the seal joint vicinity around the part to be sealed and lever means which are arranged to bear against the packings and including means for adjusting the lever means to vary the force acting thereon to provide tight sealing engagement.

A further object of the invention is to provide a flow meter which includes a central tubular member for the flow of a fluid therethrough which is made of a material which is transparent in order to observe the operation of the fluid therein and a fitting at each end of the transparent material having packing means between the fitting and the transparent material and to seal the fitting with the tube of transparent material for flow through the tube and through the fitting and including a yoke member having a collar portion surrounding the fitting at each end and lever means carried by said yoke portion an dilcuding an adjustable screw on the collar which is engageable with said lever means for varying the force actuating pressure on said packing.

A furthr object of the invention is to provide a flow meter or stuffing box construction which is simple in design, rugged in construction, and economical to manufadture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

BRIEF DESCRIPTION OF THE DRAWING

In the Drawing:

FIG. 5 is a partial exploded perspective view of a portion of the device indicated in FIG. 3.

GENERAL DESCRIPTION OF THE PREFERRED EMBODIMENTS

Figure 1:
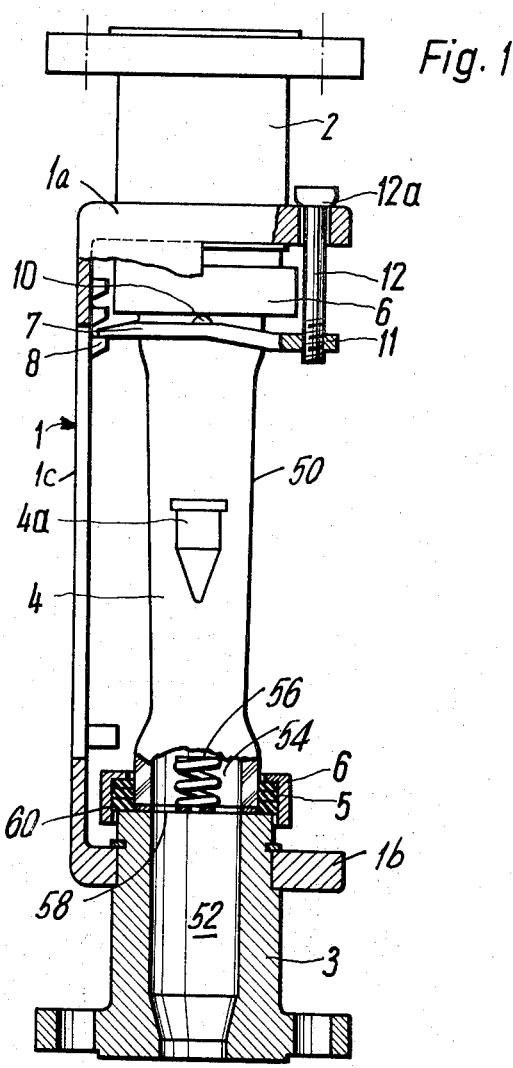
FIG. 1 is an elevational view partly in section of a flow meter constructed in accordance with the invention.
Figure 2:
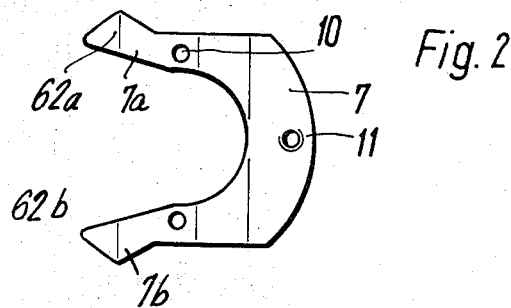
FIG. 2 is a top plan view of a lever member for use in securing the packing in the flow meter shown in FIG. 1.

Referring to the drawing in particular, the invention embodied therein in FIGS. 1 and 2 comprises, a flow meter, generally designated 50, which includes a yoke or housing part, generally designated 1, having a sleeve portion 1a and 1b which engage around respective fittings 2 and 3, which are made of a material such as a metal. The fittings 2 and 3, which are made of a material such as a metal. The fittings 2 and 3 each include a bore 52 for the passage of a fluid which communicates with a bore 54 of an intermediate member or measuring tube 4 which is made of a transparent material, such as glass. A float 4a, which is arranged within the bore 54 above a spring 56, provides a measuring indication in respect to the flow of a fluid through the bore 54 and into the bore 52 of the fitting 3.

In accordance with the invention, the transition between the measuring tube 4 and the fittings 2 and 3 is packed by gaskets 5 arranged around the end of an intermediate washer member or spacer 58. An assembly of the gaskets 5 in the form of collars are pressed against a ledge portion 60 of the associated fitting 2 or 3 by means of a thrust collar or cover 6 which encloses them and surrounds the intermeidate measuring tube 4.

The gaskets 5 are compressed by lever means in the form of a lever member 7 of forked-shaped configuration having legs 7a and 7b which extend around the measuring tube 4 and are engaged in one of a set of recesses defined between a plurality of spaced teeth 8 carried on a wall portion 1c of the yoke 1. Each arm has an offset portion 62a and 62b, respectively, which are bent upwardly or downwardly and ensure that the lever is held within the selected recess even if it is inclined. Each lever 7 is also provided with offset arm portions 7a and 7b carrying a projection or extension 10 which forms a fulcrum or cam which is pressed against the collar 6 when the lever is urged in the direcion of the collar by adjusting means in the form of a threaded screw 12 which passes freely through the associated collar 1a and 1b and is threaded into the associated lever 11.

The lever 11 may also be employed for loosening the gasket and, in such instance, it is applied at a location behind the collar 6 after the screw is first loosened. For example, in resepct to the upper lever 7, it is inserted above the collar 6 and pressed downwardly to loosen the collar and the gasket downwardly.

As shown in FIG. 5, the lever 7 is advantageously provided with an opening through its outer end for receiving an extension or arm member 7b to increase the lever force which may be exerted by the lever.

Figure 3:
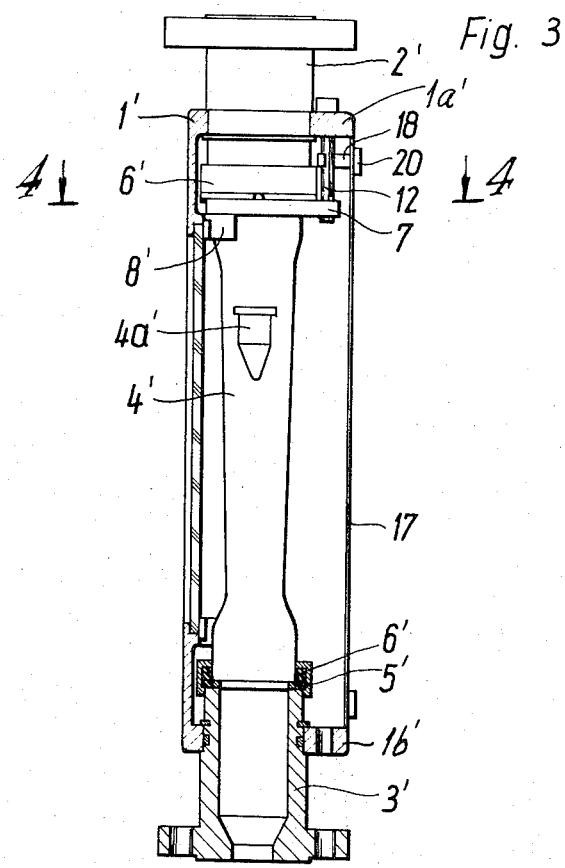
FIG. 3 is a view similar to FIG. 1 of another embodiment of the invention.
Figure 4:
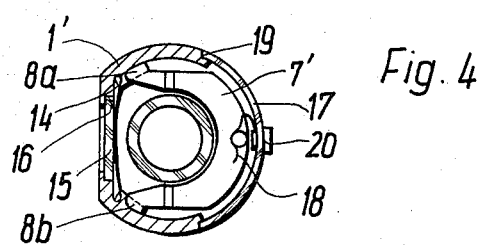
FIG. 4 is a section taken along the line 4—4 of FIG. 3.

As shown in respect to FIGS. 3, 4 and 5, where similar parts are similarly designated but with a prime, a front cover or lid member 17 is provided with a handle pin or knob 20 on one side which carries clamping springs 18 on its interior side. The clamping springs 18 are aligned with the adjustments screw 12' and the cover 17 may be positioned in place merely by inserting the clamping springs into engagement with the clamping screw 12' to hold the cover in place. In this construction, the sleeves 1a' and 1b' have rear ends with inturned parts 16 forming a ledge against which a backplate or connecting plate 15 is inserted. The backplate 15 is held in position by a spring member 14 which is inserted into semi-annular grooves 72, 72 which are formed behind projections 8a and 8b of the collar 1a'. By this simple expedient, the connecting piece 15 is held in place. This part may be removed very easily by merely removing the securing spring 16.

While specific embodiments of the invention have been shown and described in detail to illustrate the appliction of the principles of the invention, it will be understood that the invention mabe embodied otherwise without departing from such principles.

What is claimed is:

1. A seal construdtion for sealing the joint between two tubular members having a fluid flow therethrough, particularly a fluid measuring device wherein one of the tubular members is oa a transparent meterial such as glass, comprising an annular packing adapted to bear against one of said tubular members and arranged around the joint to be sealed, a collar overlying the packing a fixed member adjacent said packing definng a pressure-applying lever support, a pressure-applying lever having leg means engaged with said support and engaged over said collar at substantially diametrical locations, and adjustment means carried on said fixed support and engaged with said lever and being movable to apply pressure on said lever to apply pressure through said lever to said collar for compressing said packing into sealing engagement to seal the joint between the tubular members; said fixed member cormpsing a yoke having a straight portion and a collar at each end of said straight portion engaged with a said tubular member to be held adjacent to an intermediate tubular member made of a transparent material, said straight member defining a fixed support for said lever said adjustment means comprising a rotatable screw freely rotatable on said collar and having a threaded portion threaded to said lever for shifting said lever toward and away from said collar.

2. A seal constrcution, according to claim 1, wherein said yoke includes an inturned portion at each end defining a recess therebetween into which said straight member is fitted and spring means biasing said straight member in the recess of said sleeve.

3. A seal construction, according to claim 1, including a cover extending between said sleeve members on each end of said straight member and having a spring clip, said adjustment means comprising a threaded screw freely rotatably on said sleeve member and threadedinto said lever said cover spring clip being secured over said screw.

4. A flow meter comprising an intermediate tubular member made of a material such as glass and having a through flow bore therein, first and second fittings arranged at the respective ends of said intermediate ubualr member and having a bore forming a continuation of the flow bore of said intermediate tubular member said first and second fittings being of a thicker dimension than said intermediate member to define a shoulder abutment, ascleast one ring of packing arranged around the shoulder abutment of each tubular fitting a collar covering said packing, a yoke member including a straight portion and a seleve at each end surrounding an associated tubular fitting and including at least one lever receiving recess on said straight member, a lever member having an arm portion engaged in the receiving recess of said straight member and having a portion engaged on said collar and an end portion extending outwarsly therefrom, and a rotatable screw carried on said sleeve member and having a threaded portion threadably engaged with the end portion of said lever member for moving said lever member against said collar to apply pressure to said packing.

5. A flow meter, according to claim 4, wherein said lever member is forked and includes a leg portion on each side of said intermediate tubular member said straight member having a plurality of spaced lever receiving recesses arranged along its length to provide a selected engagement for the end of the forked arms of said lever.

6. A flow meter, comprising a removable intermediate measuring tube having a through bore therethrough, first and second fittings arranged at the respective ends of said intermediate tubular member and each having a bore forming a continuation of the flow bore of said intermediate tubular member, a ring of packing arranged around at least one of said tube and the adjacent one of said first and second fittings for sealing the joint therebetween, a thrust collar carrying said packing, a fixed yoke member supported between and connected to said first and second fittings and having a leyer receiving recess adjacent said collar, a forked lever member having first and second arm portions encircling respective sides of said tubular member, and having ends engaged in said receiving recess of said yoke member and having abutments on each arm portion substantially diametrically with said collar, and means supported on said fixed member and engagable with said lever member for moving said lever member against said collar to apply pressure to said packing.

7. A flow meter comprising an intermediate tubular member having a through flow bore therein, first and second fittings arranged at the respective ends of said intermediate tubular member and having a bore forming a continuation of the flow bore of said intermediate tubular member, at least one ring of packing arranged around at least one end of said tubular member and the adjacent fitting, a collar covering said packing, a yoke member engaged with said first and second fittings and having at least one lever receiving recess adjacent the one of said fittings having said collar, a lever member having arm means engaged in the receiving recess of said yoke member and having an intermediate portion engaged on said collar at substantially diametrical locations and an end portion extending outwardly therefrom, and means carried on said yoke member and engagable with said lever member for moving said lever member against said collar to apply pressure to said packing.

* * * * *